Patented June 22, 1937

2,084,313

UNITED STATES PATENT OFFICE 2,084,313

NONCOHERING, TRANSPARENT SHEETING

Norman F. Beach, Rochester, N. Y., assignor, by mesne assignments, to Eastman Kodak Company, Jersey City, N. J., a corporation of New Jersey No Drawing. Application July 26, 1934, Serial No. 737,101

2 Claims. (Cl. 18—57)

This invention deals with thin, transparent, cellulose organic ester sheeting, such as is used in wrapping, packaging, etc. When such sheeting is cut into sheets, and a large number of the sheets are stacked together, ready for use in wrapping or in automatic packaging machinery, they cohere together, making it difficult to remove a sheet quickly from the pile without wrinkling. This is due to the absence of air between the perfectly smooth surfaces of the sheets. The difficulty is augmented by the strong tendency of cellulose organic esters, such as cellulose acetate, cellulose acetate-propionate, etc., to accumulate charges of static electricity. The tendency to accumulate static and to cohere is many times stronger in cellulose ester sheets than in sheets of regenerated cellulose, so that any teaching in the art of regenerated cellulose is of no help with cellulose derivative sheeting.

One object of my invention is to provide thin, transparent cellulose organic ester sheeting of the wrapping type which will not cohere when stacked. Another object is to provide thin, transparent sheeting which will run smoothly through automatic packaging machinery. Other objects will hereinafter appear.

I have discovered that thin, transparent sheeting which will fulfill the objects of my invention may be prepared from cellulose organic esters, by giving to the sheeting an integral surface of cellulose derivative, which surface has been microscopically roughened by the incorporation therein of a small amount of a very finely divided substance, insufficient to impair the transparency of the sheeting. By a microscopically roughened surface, I mean a surface in which the imperfections are scarcely visible to the naked eye, but are plainly visible with a low-power microscope.

In the preferred form of my invention, I incorporate, in the cellulose ester solution or dope used for making the sheeting, a very small amount of a very finely divided inorganic pigment, insufficient to impair the transparency of the sheeting. The pigment which I prefer to use is extra fine precipitated chalk. I have found that the incorporation of an amount of this pigment equal to 0.25% of the weight of the cellulose ester is sufficient to keep the finished sheeting from cohering, and from jamming in automatic packaging machinery.

In preparing the solution or dope for making the sheeting, I may, by way of example, proceed as follows: 100 parts of cellulose acetate is dissolved, with agitation, in from 400 to 600 parts, by weight, of acetone or other cellulose acetate solvent or solvent mixture. From 10 to 50 parts of a suitable cellulose acetate plasticizer, such, for instance, as monochloronaphthalene or diethyl phthalate, is incorporated in the solution, and approximately 0.25%, based on the weight of the cellulose acetate, of extra fine precipitated chalk is added to the solution and uniformly distributed therethrough by thorough mixing. The dope is then spread in a very thin layer on a highly polished surface, in a manner well known for the preparation of sheeting, the solvent is evaporated from the layer, and the layer stripped from the polished surface. The finished sheeting may be cut to convenient sizes. The eye can detect no decrease in its transparency, as compared with similar sheeting prepared without pigment. It does not cohere when stacked, and runs smoothly through automatic packaging machinery.

In making the sheeting, I may use other cellulose organic esters, such, for instance, as cellulose propionate, cellulose acetate-propionate, cellulose butyrate, cellulose acetate-butyrate, and the like, a suitable solvent for the cellulose ester being employed. Other plasticizers compatible with the cellulose ester may be used. In place of precipitated chalk, I may use other inorganic pigments, such, for instance, as the various forms of alumina, talc, silica, titanium dioxide, barium sulfate, or tripoli. It will be observed that I use the term "pigment" not in the strict sense in which it is used in the paint industry, but more nearly as it is used in the rubber industry, to mean any finely divided, insoluble inorganic substance, regardless of its tinctorial or hiding power. If the sheeting is to be used for wrapping food products, it will be evident that both the plasticizer and the pigment used should be non-toxic. The weight of pigment to be used will vary somewhat with the specific gravity and particle size of the pigment, but may be readily determined by trial. In place of inorganic pigments, I may use organic powders, such as lycopodium, various carbohydrates (e. g. dextrin, starches and sugars), gelatins, or finely divided cellulose esters which are insoluble or incompletely soluble in the solvent or solvent mixture used in making the dope. Or, I may add to the clear dope a small amount of a "grainy" cellulose organic ester dope, i. e., a cellulose organic ester solution containing a cellulose organic ester which is imperfectly soluble in the solvent used.

In any case, the amount of pigment or other insoluble substance used must be so small that the transparency of the finished sheet is not impaired. I am aware that "frosted" surfaces have been produced on sheeting by various means, such as by coating on a roughened plate. Also, it has been proposed to promote slippage between thin sheets by coating them with a layer of talc. This has obvious disadvantages in that the talc soils the sheets, rubs off, etc. My invention is unique in providing a transparent cellulose organic ester sheeting having an integral, cellulose organic ester surface microscopically roughened by the incorporation of a small amount of an insoluble material.

I prefer to avoid the use of any "subbing" operation, i. e., coating of formed sheeting with a liquid by means of an applicator roll, spraying, etc. However, it is possible to coat ordinary cellulose organic ester sheeting with a layer of cellulose derivative dope containing finely divided insoluble substances (such as that described above) in amount insufficient to impair the transparency of the sheet, and I regard this as coming within the broad scope of my invention, inasmuch as it gives an integral surface which is microscopically roughened.

What I claim as my invention and desire to be secured by Letters Patent of the United States is:

1. A thin, transparent, cellulose acetate sheet of the wrapping type, containing finely divided chalk in an amount equal to from 0.20% to 0.30%, approximately, of the weight of the cellulose acetate, the amount of chalk being sufficient to microscopically roughen the surface of the sheet, but insufficient to impair the transparency of the sheet.

2. A thin, transparent cellulose organic acid ester sheet of the wrapping type, containing finely divided chalk in an amount equal to from 0.20% to 0.30%, approximately, of the weight of the cellulose ester, the amount of chalk being sufficient to microscopically roughen the surface of the sheet, but insufficient to impair the transparency of the sheet.

NORMAN F. BEACH.